United States Patent [19]

Triponez

[11] Patent Number: 4,868,402
[45] Date of Patent: Sep. 19, 1989

[54] DEVICE FOR DETECTING THE TRANSIT OF A MOBILE MEMBER THROUGH A REFERENCE POSITION

[75] Inventor: André Triponez, Lamboing, Switzerland

[73] Assignee: ETA SA Fabriques d'Ebauches, Grenchen, Switzerland

[21] Appl. No.: 159,085

[22] Filed: Feb. 23, 1988

[30] Foreign Application Priority Data

Mar. 3, 1987 [CH] Switzerland ............... 00797/87

[51] Int. Cl.⁴ .................................. G01N 21/86
[52] U.S. Cl. .......................... 250/561; 250/214 C
[58] Field of Search ............ 250/214 C, 231 SE, 561; 368/187

[56] References Cited

U.S. PATENT DOCUMENTS

| | | | |
|---|---|---|---|
| 3,421,009 | 1/1969 | Caruthers | 250/214 C |
| 3,931,513 | 1/1976 | Germain | 250/214 C |
| 4,420,263 | 12/1983 | Besson et al. | |
| 4,593,194 | 6/1986 | Grahama et al. | |
| 4,659,930 | 4/1987 | Johnson et al. | 250/214 C |

OTHER PUBLICATIONS

Patent Abstracts of Japan, vol. 9, No. 217 (p-385) [1940], 4 Sep. 1985; & JP-A-60 76 612 (Matsushita Denko K.K.) 01-05-1985.

*Primary Examiner*—David C. Nelms
*Assistant Examiner*—Khaled Shami
*Attorney, Agent, or Firm*—Pollock, Vande Sande & Priddy

[57] ABSTRACT

The device comprises a photo-electric detection sensor (4), a luminescent diode (1) that produces a light beam for illuminating the detection sensor (4) and an opaque element (5) that is formed with an opening (6) and is mechanically connected to a mobile member (A), such as a hand of a timepiece, whose transit through a reference position is to be detected. The opaque element (5) and the opening (6) are so disposed as to allow the light beam to travel on or to be interrupted depending on whether the mobile element (A) is in its reference position or in another position. The device further comprises a comparator (13) which compares the signal produced by the detection sensor (4) with a reference signal produced in response to a signal supplied by a reference photo-electric sensor (9) that is manufactured on the same plate of semi-conductor material (3) as the detection sensor (4) and is so disposed as to receive no light.

4 Claims, 1 Drawing Sheet

DEVICE FOR DETECTING THE TRANSIT OF A MOBILE MEMBER THROUGH A REFERENCE POSITION

BACKGROUND OF THE INVENTION

This invention relates to a device for detecting the transit of a mobile member through a reference position of the kind comprising a photo-electric detection sensor made in a plate of semi-conductor material and able to produce a signal dependent on its illumination, means able to produce a light beam for illuminating the detection sensor, means associated with the mobile member and disposed in the path of the light beam for modifying the illumination of the detection sensor in dependence on the position of the mobile member, means for producing a reference signal, and means for producing a detection signal by comparing the signal produced by the detection sensor with the reference signal.

A device of this kind is described e.g. in U.S. Pat. No. 4,420,263, in a case where it is used to detect the transit of one of the hands of a timepiece through a reference position, for instance the position occupied by the hours hand at noon and at midnight.

The signal produced by this device is used by a circuit which periodically compares the actual position of this hand with the position it ought to have and which corrects this actual position as required. This circuit will not be described here.

The detection device described in the above mentioned U.S. Pat. No. 4,420,263 comprises a mobile disc that is mechanically connected to the hand whose transit through the reference position is to be detected. This disc rotates about its axis at the same mean speed as this hand.

This device also comprises a luminescent diode and a photo-transistor that are located, in a first constructional form, on opposite sides of the disc. The latter is opaque and is formed with a hole which is so disposed that light emitted by the luminescent diode will reach the photo-transistor only when the hand is in the reference position.

In another constructional form, also described in U.S. Pat. No. 4,420,263, the luminescent diode and the photo-transistor are disposed on the same side of the device further comprises a stationary mirror disposed opposite the diode and the transistor on the other side of the disc. The disc is also formed with a hole, and when the hand is in its reference position, light emitted by the luminescent diode reaches the photo-transistor after having been reflected by the mirror.

In the device described in U.S. Pat. No. 4,420,263, the photo-transistor is connected to the circuit that uses its signal by a shaping circuit whose nature and operation are not disclosed.

It is however obvious to the man of the art that such a shaping circuit includes a comparator which compares the signal supplied by the photo-transistor with a reference signal and which issues on its output a high or low logic signal depending on the outcome of this comparison.

In some cases, the signal supplied by the photo-transistor is constituted by the voltage across the terminals of the photo-transistor or across the terminals of a component series-connected therewith and in other cases by the current flowing through the photo-transistor. The reference signal is of course of the same nature as the signal supplied by the photo-transistor, i.e. it is constituted either by a reference voltage or by a reference current.

It is also well-known to the man of the art that, in some cases, the value of the reference signal is determined by the characteristics of one or more components of the comparator itself, e.g. by the threshold voltage of one of the transistors it comprises, and that, in other cases, this reference signal is supplied by a suitable source, external to the comparator. In all cases, the reference signal has a fixed value.

It is well-known too that the characteristics of phototransistors of a certain type, in particular the value of the signal they produce in given conditions of use in dependence on the intensity of the light they receive, vary to a considerable extent from one specimen to another, and, in the case of each specimen, with time. The same is also true for any kind of photo-electric sensor.

These variations are in general so large that the characteristics of each sensor must be measured individually before it is fitted in the detection device to make sure the latter will work properly.

Such individual measurement of the characteristics of these sensors is very costly. Besides, it does not even ensure the device will work correctly for a reasonably long period of time since these characteristics may vary with time to a considerable and unforeseeable extent.

SUMMARY OF THE INVENTION

An object of the present invention is to provide a device for detecting the transit of a mobile member through a reference position, of the kind set forth above but which operates correctly whatever may be the particular characteristics of the photo-electric sensor, and whatever may be the variations of these characteristics with time.

To this end, the invention provides a device of the kind set forth wherein the means for producing a reference signal include a photo-electric reference sensor made in the same plate as the detection sensor and able to produce with a corresponding illumination a signal substantially identical to that produced by the detection sensor and include a circuit for producing the reference signal in dependence on the signal produced by the reference sensor, and wherein the light beam producing means and the means for modifying the illumination of the detection sensor are so arranged that the illumination of the detection sensor will differ from the illumination of the reference sensor in at least one position of the mobile member.

BRIEF DESCRIPTION OF THE DRAWINGS

The invention will be described with reference to the accompanying drawings, in which.

DETAILED DESCRIPTION

Figure 1:
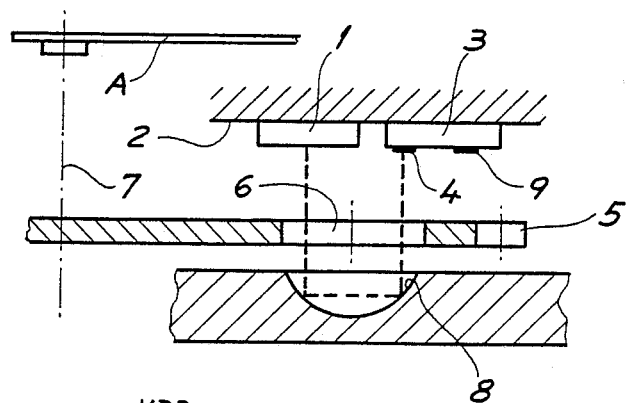
FIG. 1 is a partial cross-sectional view of a timepiece fitted with a device according to the invention.

The device shown in FIG. 1 is used to detect the transit of one of the hands of a timepiece through a set, or reference, position, which may for instance be the position occupied at noon or at midnight by the hours hand of the timepiece. The hand whose transit through the reference position is being detected by the device of FIG. 1 is referenced A.

The device of FIG. 1 comprises a light source 1 which, here, is an electro-luminescent diode. Luminescent diode 1 is disposed on a support 2 which may be the bottom plate or a bridge of the timepiece, or any other suitable element.

The device of FIG. 1 comprises also a plate 3 made of semi-conductor material such as silicon and treated by well-known techniques used in the manufacture of integrated circuits to form a photo-electric sensor 4 in a particular region of its surface.

It should be noted that, in actual fact and unlike what has been shown in FIG. 1 to facilitate the description and better to illustrate the position of sensor 4, the latter does not project from the surface of plate 3.

In the present embodiment, plate 3 is disposed beside luminescent diode 1, on the same support 2.

The device of FIG. 1 further comprises an opaque element 5 formed with an opening 6. Opaque element 5 here consists of a toothed wheel that forms the last wheel of a gear-train, not shown, driving hand A. Wheel 5 is thus rigidly linked, in a manner that has not been shown either, to hand A and thus rotates about its axis 7, which of course is common with the rotational axis of hand A, at the same speed as the latter.

The opaque element 5 may also consist of a toothed wheel that does not directly form part of the gear-train driving hand A but which nonetheless is driven by this gear-train. In this latter case, the wheel forming opaque element 5 may be driven exactly and permanently at the same regular speed as hand A. This wheel may also be driven stepwise at a variable speed which only on average is equal to the rotational speed of hand A. These latter constructional forms for opaque element 5 and for its mechanical linkage with hand A have not been illustrated.

The device of FIG. 1 moreover comprises a mirror 8 disposed opposite diode 1 and sensor 4, on the other side of wheel 5. Mirror 8 may be an independent component that is mounted wherever required, or simply be formed in, for instance, a bridge of the timepiece by a suitable machining operation.

Diode 1, sensor 4, wheel 5, opening 6 and mirror 8 are so arranged in relation to one another that sensor 4 will be illuminated by the light emitted by diode 1 when hand A is in its reference position, such light reaching sensor 4 after having travelled through opening 6 and having been reflected by mirror 8, and that sensor 4 will not be illuminated when hand A is in any other position, wheel 5 then interrupting the light beam being emitted by diode 1.

The device of FIG. 1 furthermore comprises a second photo-electric sensor 9, produced during the same manufacturing operation as sensor 4, in another region of the surface of plate 3. Like sensor 4, sensor 9 obviously does not project from the surface of plate 3, unlike what has been shown in FIG. 1 to simplify the description and to illustrate the position of sensor 9.

Sensor 9 is disposed on plate 3, and the latter is so disposed on support 2, that sensor 9 may never receive light, whatever may be the position of hand A and hence of wheel 5.

Figure 2:
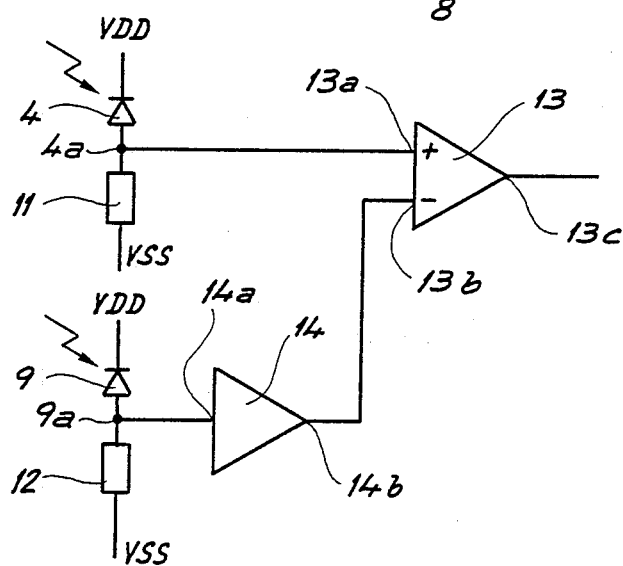
FIG. 2 is a diagram showing one particular form of arrangement for the electronic part of a device according to the invention.

In the electronic circuit, illustrated by way of example in FIG. 2, of the detection device according to the invention, photo-electric sensors 4 and 9 are respectively connected in series with resistors 11 and 12, and the resulting arrangements are connected across the positive terminal VDD and negative terminal VSS of a supply source not shown. This source also supplies, via connections that have not been shown either, the other components of the FIG. 2 circuit which will be described below.

In the following part of the description, and in accordance with generally acknowledged pratice, the voltage at a point of the circuit will be understood to mean the difference between the potential at this point and that at the above-mentioned negative terminal VSS.

The junction point 4a between sensor 4 and resistor 11 is connected to the non-inverting input 13a of a differential amplifier 13. The junction point 9a of sensor 9 and of resistor 12 is connected to the input 14a of an amplifier 14 whose output 14b is connected to the inverting input 13b of amplifier 13.

The above-mentioned amplifiers 13 and 14 will not be described in detail as they are well-known. Besides, their precise constitution bears no direct relation with this invention.

Suffice it to note that in this embodiment the output 13c of amplifier 13 will take up a first or second state depending on whether the voltage of input 13a is lower or higher than that of input 13b. These two states are, for instance, those which are recognized as being low and high logic states by the circuit that is connected to the output 13c and which is intended to check whether hand A actually does transit through its reference position at the instants it is required to. This circuit has not been illustrated.

Similarly, amplifier 14 is so arranged that its voltage gain g will have a constant and well defined value, whose choice will be described later.

Since sensors 4 and 9 are produced on plate 3 by a well-known technique used in the manufacture of integrated circuits, it is clearly of advantage also to produce amplifiers 13 and 14 and resistors 11 and 12 on plate 3 at the same time as sensors 4 and 9. The other electronic circuits of the timepiece, in particular the circuit, not shown, that is connected to the output 13c of amplifier 13, may also be produced on plate 3.

The fact that sensors 4 and 9 are manufactured at the same time and on a common plate of semi-conductive material means that their characteristics are very alike and that the way in which those charateristics vary with time are very similar.

Figure 3:
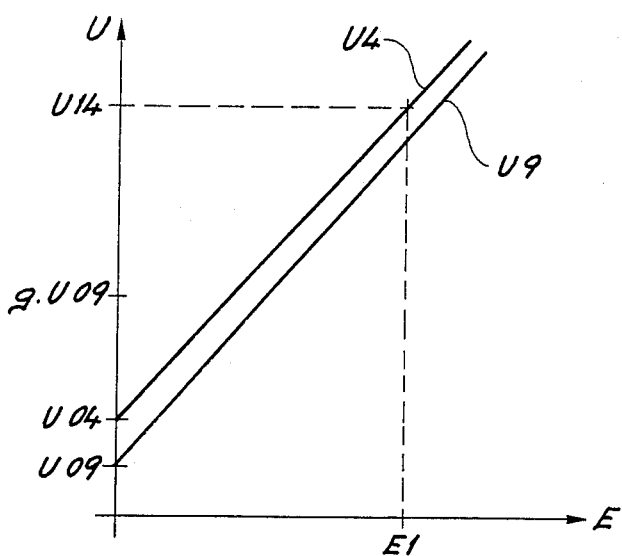
FIG. 3 graphically illustrates one characteristic of certain components used in a device according to the invention.

FIG. 3 graphically illustrates voltages U4 and U9 measured at points 4a and 9a of the FIG. 2 diagram in dependence on the illumination E of sensors 4 and 9. These measurements were of course made before fitting plate 3 in the device of FIG. 1 since, after such fitting, sensor 9 no longer receives light and the illumination of sensor 4 is either nil or equal to a constant value that is determined by the intensity of the light being emitted by luminescent diode 1 and by the relative arrangement of the various components of the device. This illumination of sensor 4 is referenced El in FIG. 3.

The characteristics of sensors 4 and 9 are however in practice never identical. In particular, voltages U04 and U09 measured at points 4a and 9a, when both sensors 4 and 9 receive no light, are generally different, without it being possible to know ahead of time which of the two will be the higher.

This is the reason for providing amplifier 14. The voltage gain g of this amplifier is chosen such as to fulfil the following two conditions:

First, gain g is so chosen that the voltage supplied by the output 14b of amplifier 14 and equal to g.U09, will certainly be higher than voltage U04.

Additionally, gain g is so chosen that voltage g.U09 will certainly be lower than voltaqe U14 which is present at point 4a when the illumination of sensor 4 is equal to E1, i.e. when hand A is in its reference position and when sensor 4 is illuminated by the light being emitted by luminescent diode 1.

In practice, these two conditions are generally found to be satisfied when the value of gain g of amplifier 14 lies between about 2 and about 10. The choice of the exact value of gain g is thus fairly free.

The operation of the detection device shown in FIGS. 1 and 2 will readily be apparent from these two figures and from the explanations given above.

The signal supplied by detector 4, which in this embodiment is constituted by the voltage that is present at point 4a, is permanently compared by amplifier 13 with a reference signal which, again in this embodiment, is constituted by voltage g.U09 supplied by the output of amplifier 14.

When hand A is in a position other than its reference position, the light beam being emitted by luminescent diode 1 is interrupted by wheel 5, and sensor 4 receives no light. The voltage at point 4a is thus lower than the reference voltage, and the output 13c of amplifier 13 is in a low logic state.

When hand A is in its reference position, sensor 4 is illuminated by the light being emitted by luminescent diode 1 as it can then travel through opening 6. The voltage at point 4a is thus higher than the reference voltage, and the output 13c of amplifier 13 is then in a high logic state.

The signal supplied by the output 13c of amplifier 13 then constitutes a detection signal indicative of the transit of hand A through its reference position since it goes high or low depending on whether hand A is in this reference position or is in another position.

The fact that sensors 4 and 9 are produced at the same time and on a common plate of semi-conductor material, and that their characteristics are very alike and vary practically in the same way with time, means that the voltage at point 4a is certainly always distinctly lower or distinctly higher than the reference voltage which is a well-defined multiple of the voltage at point 9a, regardless of the particular characteristics of sensors 4 and 9 and of the way in which these characteristics vary with time.

Amplifier 13 may therefore safely carry out the comparison between the voltage supplied by sensor 4 and the reference voltage, and the detection signal provided by the output 13c of amplifier 13 will always accurately indicate whether or not hand A is in its reference position.

The need individually to measure sensors intended to be used in known detection devices then disappears, thereby considsrably lowering the cost price of a device according to the invention and increasing also the length of time during which the device will operate properly.

Clearly the invention is not limited to the case described above where the signals issued by sensors 4 and 9 are respectively constituted by the voltages that are present at points 4a and 9a, but applies also to the cases where the signals issued by sensors 4 and 9 are of a different nature and are for instance constituted by the currents flowing in sensors 4 and 9. In such cases, amplifier 14 is of course so designed that the reference signal it issues is a reference current equal to a well-defined multiple of the current flowing in sensor 9, and amplifier 13 is so designed as to bs able to compare the current flowing in sensor 4 with the reference current and to issue the above-mentioned detection signal in dependenoe on the result of this comparison.

Such a detection device has not been illustrated as its design is within the scope of the man of the art.

The fact that sensors 4 and 9 are produced on a plate of semi-conductor material also means that the signal they issue when they receive no light may be extremely weak, and possibly even nil.

Under these conditions, the device according to the invention might not operate properly because the value of the reference signal would then also be very weak and might not be clearly higher, or might even be lower, than the value of the signal issued by sensor 4 when the latter receives no light.

To avoid this drawback, it suffices to design and to arrange the elements of the device according to the invention in a manner such that sensor 9 may permanently receive a small amount of light, and that the signal it issues may never be nil. The reference signal produced by amplifier 14 will thus always have a value sufficient to enable amplifier 13 safely to compare the signal issued by sensor 4 with the reference signal.

For sensor 9 permanently to receive some light various steps may be taken, e.g. providing the side of wheel 5 that faces luminescent diode 1 and sensors 4 and 9 with a dulled surface such as to cause part of the light emitted by diode 1 to be diffused, in particular towards sensors 4 and 9.

Many modifications may be made to the above described device within the realm of the invention.

For example, a mirror similar to mirror 8 may be placed on wheel 5 in the location occupied, in FIG. 1, by opening 6. In this case, wheel 5 may, obviously, either be opaque or transparent.

Again for example, plate 3 may be disposed on the other side of wheel 5 in relation to luminescent diode 1 whereby light emitted by the latter will reach sensor 4 when opening 6 in wheel 5 is located between diode 1 and sensor 4.

In this embodiment, the various elements of the device must of course be so arranged in relation to each other and/or so sized that sensor 9 may receive no light, or only a small amount of light, even when sensor 4 is illuminated by the light being emitted by luminescent diode 1 and that passes through opening 6 in wheel 5.

In this embodiment also, mirror 8 in FIG. 1 no longer serves any purpose and is therefore dispensed with.

In another embodiment of the device according to the invention, wheel 5 in FIG. 1 is replaced by a transparent disc that also rotates at the same speed as hand A and which comprises an opaque region at the location occupied by opening 6 in wheel 5. In this embodiment, sensor 4 obviously is illuminated by the light that is emitted by diode 1 as long as hand A is in a position other than its reference position, and stops receiving light when hand A is in this reference position.

This transparent disc that comprises an opaque region may moreover be replaced by a mere opaque finger that rotates about axis 7 in FIG. 1 and whose end remote from axis 7 breaks the light beam produced by diode 1 when hand A is in its reference position.

Clearly, in this embodiment, luminescent diode 1 and plate 3 may be arranged in facing relationship on opposite sides of he above mentioned transparent disc or opaque finger, or be arranged on the same side as this disc or finger. In this latter event the device obviously has a mirror similar to mirror 8 in FIG. 1.

Again in this embodiment and whatever may be the relative position of luminescent diode 1 and of plate 3, it may be difficult to arrange and to size the various elements of the device in such a way that sensor 9 will never receive light or only little light.

To overcome this difficulty, the various elements of the device may be so disposed and sized that, instead, sensor 9 will permanently receive an amount of light equivalent to that received by sensor 4 when it is illuzinated by luminescent diode 1. It then suffices to replace amplifier 14 in the diagram of FIG. 2 by another circuit so arranged that the above-mentioned reference signal has a value equal to a set fraction of the value of the signal issued by sensor 9. This other circuit may simply be a voltage divider, or an amplifier, having a gain less than 1.

The operation of this embodiment of the device according to the invention will not be described as it can readily be deduced from the explanations given earlier in connection with FIGS. 1 to 3.

The use of a device as in the various embodiments described above is not limited to detecting the transit through a reference position of a timepiece hand.

The device according to the invention may also be used to advantage in any one of the many kinds of apparatus having a mobile member acting as a display member, such as a hand, whose position in relation to a stationary dial is dependent on the value of a physical magnitude.

Samples of such kinds of apparatus are voltmeters, amperemeters, flowmeters, etc. The device according to the invention may also be used in apparatus wherein the mobile member has no display function. Examples of such kinds of apparatus are those having a mobile member consisting of a bimetallic spring dipped into a fluid and which changes its shape in dependence on the temperature of the fluid.

In all of these kinds of apparatus, the signal that is produced by the device when the mobile member comes to occupy a set reference position may be used for a variety of purposes, e.g. the triggering off of an alarm or of a particular operation in a manufacturing or other process.

What is claimed is:

1. A device for detecting the transit of a mobile member through a reference position, comprising:

a photo-electric detection sensor made in a plate of semiconductor material and able to produce a signal dependent on illumination thereto;
 means able to produce a light beam for illuminating said detection sensor;
 means associated with said mobile member and disposed in the path of said light beam for modifying the illumination of said detection sensor in dependence on the position of said mobile member;
 means for producing a reference signal; and
 means for producing a detection signal by comparing the signal produced by said detection sensor with said reference signal, wherein said means for producing a reference signal includes:
   (a) a photo-electric reference sensor made in the same plate as said detection sensor and able to produce with the same illumination a signal substantially identical to that produced by said detection sensor; and
   (b) a circuit connected to said reference sensor for producing said reference signal with a value equal to a set multiple of the signal produced by said reference sensor;
 wherein said light beam producing means and said means for modifying the illumination of said detection sensor are so arranged that the illumination of said detection sensor will differ from the illumination of said reference sensor in at least one position of said mobile member.

2. A device according to claim 1, wherein said detection and reference sensors, said light beam producing means and said means for modifying the illumination of said detection sensor are so arranged that said reference sensor permanently receives a fraction of the light produced by said light beam producing means.

3. A device according to claim 1, wherein said means for modifying the illumination of said detection sensor include an opaque element that is mechanically linked to said mobile member and which is so disposed as to interrupt said light beam when said mobile member is in a position other than said reference position, and an opening in said opaque element to allow said light beam to travel therethrough when said mobile member is in said reference position.

4. A device according to claim 1, wherein said mobile member is an indicator member in a timepiece and said means for modifying the illumination of said detection sensor include an opaque wheel that is mechanically connected to said indicator member and which is so disposed as to interrupt said light beam when said indicator member is in a position other than said reference position, and an opening in said wheel to allow said light beam to travel therethrough when said indicator member is in said reference position.

* * * * *